J. G. BLUNT.
BY-PASS VALVE FOR LOCOMOTIVES.
APPLICATION FILED JUNE 16, 1908.
921,583.
Patented May 11, 1909.
2 SHEETS—SHEET 1.
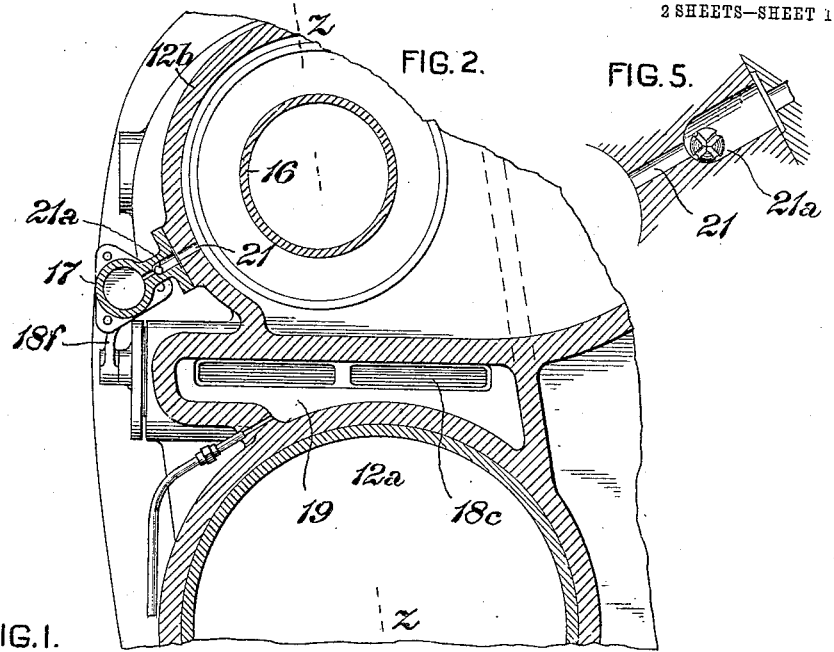
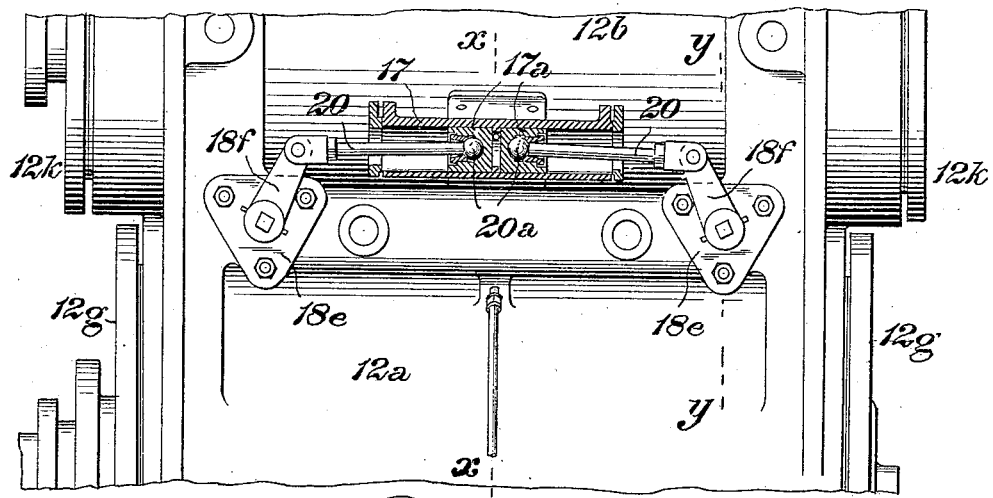
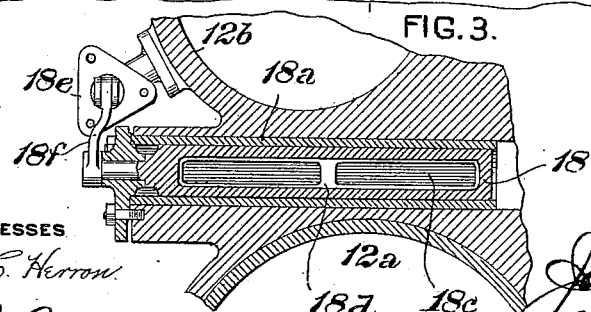
WITNESSES
James C. Herron
S. R. Bell
INVENTOR
James G. Blunt
by J. Snowden Bell
Att'y.

J. G. BLUNT.
BY-PASS VALVE FOR LOCOMOTIVES.
APPLICATION FILED JUNE 16, 1908.
921,583.
Patented May 11, 1909.
2 SHEETS—SHEET 2.
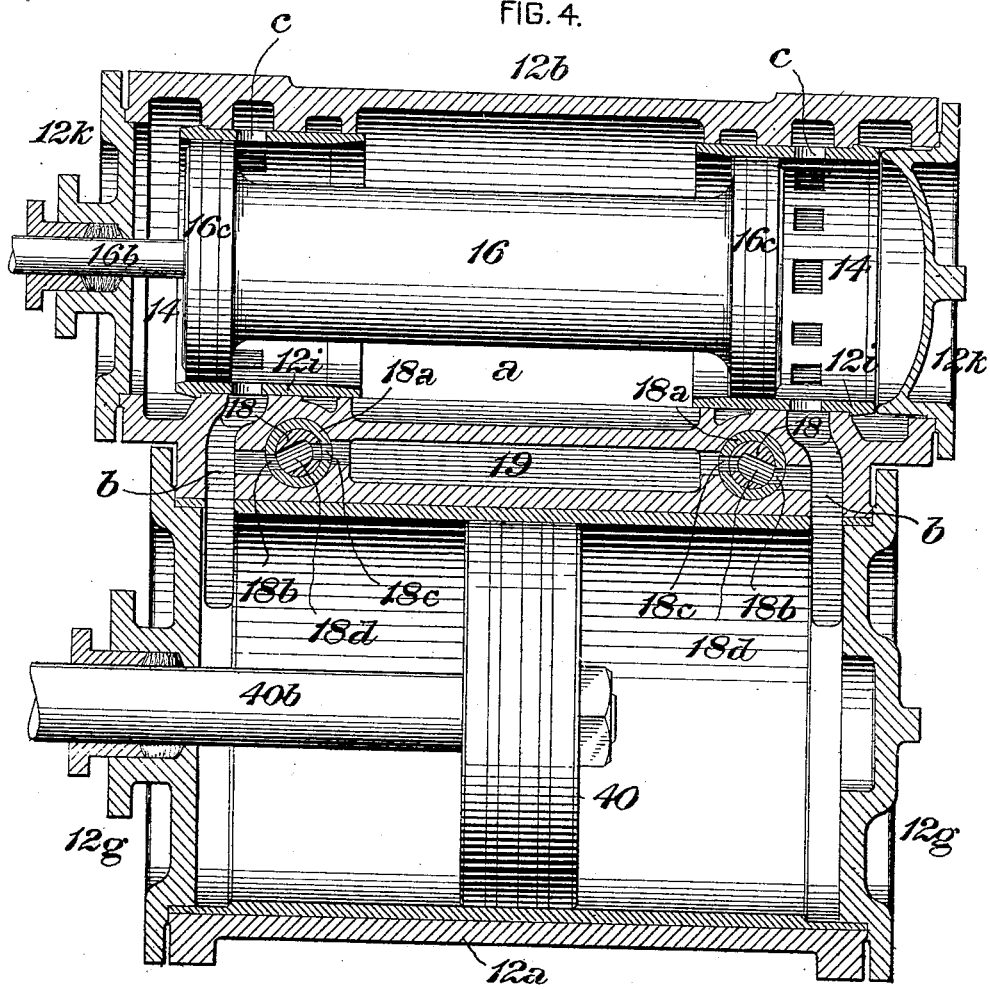

UNITED STATES PATENT OFFICE.

JAMES G. BLUNT, OF SCHENECTADY, NEW YORK, ASSIGNOR TO AMERICAN LOCOMOTIVE COMPANY, OF NEW YORK, N. Y., A CORPORATION OF NEW YORK.

BY-PASS VALVE FOR LOCOMOTIVES.

No. 921,583.

Specification of Letters Patent.

Patented May 11, 1909.

Application filed June 16, 1908. Serial No. 438,699.

*To all whom it may concern:*

Be it known that I, JAMES G. BLUNT, of Schenectady, in the county of Schenectady and State of New York, have invented a certain new and useful Improvement in By-Pass Valves for Locomotives, of which improvement the following is a specification.

My invention relates to by pass valves used in locomotive engines for preventing the objectionable results of expansion and compression in the cylinders when the engine is "drifting", or running, with a closed throttle, on a descending grade, and its object is to provide an appliance of this general type which shall be positively acting, and thereby overcome the objectionable result of hammering and pounding to which devices of this character have ordinarily heretofore been subject; which shall provide an area of by pass opening equal to that of the main steam port, without appreciably increasing the cylinder clearance; and which will further perform the functions of cylinder relief or vacuum valves.
The improvement claimed is hereinafter fully set forth.

In the accompanying drawings: Figure 1 is a view, partly in elevation and partly in section, illustrating an application of my invention to a locomotive cylinder and valve chest; Fig. 2, a transverse section, on the line $x$ $x$ of Fig. 1; Fig. 3, a similar section, on the line $y$ $y$ of Fig. 1; Fig. 4, a longitudinal section, on the line $z$ $z$ of Fig. 2, and Fig. 5, an enlarged section through the steam supply pipe.

My invention is herein exemplified in connection with a locomotive engine cylinder, $12^a$, in which is fitted a piston, 40, fixed upon a piston rod, $40^b$, and which communicates, by induction and eduction ports, $bb$, adjacent to its ends, with a valve chest, $12^b$, having a central steam space, $a$, which is in constant communication with a steam supply passage leading from the boiler, and end exhaust spaces, 14, which are in constant communication with an exhaust passage. The supply and exhaust of steam to and from the cylinder are effected by a distribution valve, which is of the internal admission piston type, and comprises a hollow or tubular body, 16, and two end pistons, $16^c$, fixed upon a valve stem, $16^b$, and reciprocated by any suitable valve gear, in the ordinary manner.
The end pistons, $16^c$, are fitted truly to traverse in bushings or linings, $12^i$, fixed in the valve chest and provided with ports $cc$, which communicate with the cylinder ports, $bb$, and through which, by the movements of the distribution valve, each of the cylinder ports is alternately put into communication with the steam space, $a$, of the valve chest, and with the adjacent exhaust space thereof, respectively. The ends of the cylinder are closed by heads, $12^g$, and those of the valve chest by heads, $12^k$, and the construction thus far described is one which is well known and extensively used.

In the practice of my invention, I connect to the outside of the valve chest, $12^b$, an open ended horizontal actuating cylinder, 17, of small diameter, in which are fitted two pistons, $17^a$, and bore out the main cylinder casting transversely, adjacent to each of the ports, $b$, $b$, to receive, in each bore, a sleeve or bushing, $18^a$, having, on one side, ports $18^b$, communicating with the adjacent induction and eduction port, $b$, and, on the other, ports, $18^c$, communicating with a longitudinal passage, 19, formed in the cylinder casting and extending from one of the bushings, $18^a$, to the other. A cylindrical valve, 18, of the rocking or vibratory type, is fitted in each of the bushings, $18^a$, said valve having a transverse port, $18^d$, adapted to register with the ports of the inclosing bushing, and having a stem on its outer end which passes through, and is guided in, a cap plate, $18^e$, covering the outer end of the bushing. The area through the ports of the bushings and valves is made substantially as large as that through the induction and eduction ports, $b$. A crank arm, $18^f$, is fixed upon the end stem of each of the valves, 18, and said crank arms are coupled, by connecting rods, 20, to the pistons, $17^a$, of the actuating cylinder, 17. The connecting rods, 20, pass through the open ends of the cylinder, and are preferably, as shown, coupled to the pistons by ball joints, $20^a$.

A steam supply pipe, 21, leads from the steam space of the valve chest to the cylinder, 17, between the pistons, $17^a$, thereof, and said pipe is enlarged, adjacent to its end which communicates with the valve chest, to form a chamber for a peripherally grooved regulating valve, $21^a$, which, when the locomotive is running under steam, seats at the lower end of chamber, and restricts the passage of steam to the cylinder to that permitted by its grooves. When the locomotive is not under steam, the regulating valve falls by gravity into position in which it does not restrict the area of the supply pipe, as shown in Fig. 5.

In the operation of the appliance, when the throttle of the locomotive is opened, steam is admitted from the valve chest, between the pistons, 17ª, of the actuating cylinder, the supply being suitably regulated by the valve, 21ª, and said pistons, being thereby forced outwardly in the cylinder, turn the valves, 18, through the connecting rods, 20, into position in which their ports, 18ᵈ, are moved out of register with the ports of the bushings, 18ª, and communication between one end of the engine cylinder, 12ª, and the other, is thereby cut off. When the throttle is closed, and the engine is running without steam in the cylinders, atmospheric pressure on the open outer sides of the pistons, acting against the vacuum, or partial vacuum, which is formed in the valve chest by the movements of the main pistons, forces the pistons of the actuating cylinder, 17, inwardly, and thereby moves the valves, 18, into the positions shown in Fig. 4, in which positions free communication is established between the ends of the engine cylinders, 12ª, through the induction and eduction ports, b, the ports of the valves, 18, and their bushings, and the intermediate passage, 19.

I claim as my invention and desire to secure by Letters Patent:

1. In a by pass mechanism for locomotive cylinders, the combination of a passage directly connecting the induction and eduction ports of the main cylinder, valves adapted to open and close direct communication between said passage and said ports, and fluid pressure actuating mechanism positively connected to said valves and in communication with a source of pressure.

2. In a by pass mechanism for locomotives having a valve chest and main cylinder, the combination of a passage formed in the main cylinder casting and directly connecting the induction and eduction ports thereof, valves adapted to open and close direct communication between said passage and said ports, and a fluid pressure cylinder in communication with the valve chest and having a piston connected to and effecting the opening and closure of said valves.

3. In a by pass mechanism for locomotive cylinders, the combination of a passage directly connecting the induction and eduction ports of the main cylinder, valves adapted to open or close direct communication between said passage and said ports, and actuating mechanism operated in one direction by atmospheric pressure and in the other by boiler pressure and positively connected to said valve.

4. In a by pass mechanism for locomotive cylinders, the combination of a passage directly connecting the induction and eduction ports of the main cylinder, valves controlling communication between said passage and said ports, actuating mechanism operated in one direction by atmospheric pressure and in the other by boiler pressure and positively connected to said valves, and a valve for automatically regulating the application of pressure to said actuating mechanism.

5. In a by pass mechanism for locomotives having a valve chest and main cylinder, the combination of a passage directly connecting the induction and eduction ports of the main cylinder, valves adapted to open or close direct communication between said passage and said ports, an open ended actuating cylinder located between said valves, pistons fitting said cylinder and coupled to said valves, and a steam supply pipe connecting the space between the pistons of the actuating cylinder with the steam space of the distribution valve chest.

6. In a by pass mechanism for locomotive cylinders, the combination of a passage directly connecting the induction and eduction ports of the main cylinder, valves controlling communication between said passage and said ports, an open ended actuating cylinder located between said valves, pistons fitting said cylinder and coupled to said valves, a steam supply pipe connecting the space between the pistons of the actuating cylinder with the steam space of the distribution valve chest, and an automatic regulating valve controlling said steam supply pipe.

7. In a by pass mechanism for locomotives having a valve chest and main cylinder, the combination of a passage formed in the main cylinder casting and directly connecting the induction and eduction ports thereof, rocking or vibratory valves adapted to open or close direct communication between said passage and said ports, crank arms fixed on the ends of said valves, an open ended actuating cylinder located between said valves, pistons fitting said cylinder, connections coupling said pistons to the crank arms of the valves, and a steam supply pipe connecting the space between said pistons with the steam space of the distribution valve chest.

JAMES G. BLUNT.

Witnesses:
HAL. R. STAFFORD,
J. S. PFEIFFER.